United States Patent Office 2,754,284
Patented July 10, 1956

2,754,284
SYNTHETIC LINEAR POLYAMIDES CONTAINING INTRALINEAR SILOXANE GROUPS AND PREPARATION

Stanley Brooke Speck, Buffalo, N. Y., assignor to E. I. du Pont de Nemours and Company, Wilmington, Del., a corporation of Delaware No Drawing. Application January 31, 1951, Serial No. 208,843

13 Claims. (Cl. 260—46.5)

This invention relates to polymeric materials and more particularly to new fiber- and film-forming synthetic linear condensation polymers having new and unusual properties.

This application is a continuation-in-part of my copending application Serial No. 106,322, filed July 22, 1949.

It is known to react difunctional reactants capable of yielding linear condensation polymers, under conditions such that linear condensation superpolymers are formed which can be spun into useful filaments capable of being cold drawn. Carothers U. S. Patents 2,071,250, 2,071,253, 2,130,523 and 2,130,948 in particular, disclose the preparation of such linear condensation superpolymers. Those polyesters and polyamides described in the aforementioned patents having an intrinsic viscosity greater than 0.3 are primarily useful as fiber forming materials, and because of their stability, high melting points, relative insolubility, etc., they are very useful in the textile and allied arts. The lower molecular weight linear condensation polymers are used with great advantages in coating compositions, and as softeners, moulding powders, etc.

An object of this invention is to provide novel superpolymers of the class of linear condensation polymers.

Another object is to provide novel linear condensation superpolymers capable of being converted into cold-drawable filaments having unusual and advantageous characteristics.

Still another object is to provide oriented filaments of novel linear condensation superpolymers, which filaments have good stability, strength, dyeing characteristics, elastic recovery, and an exceptionally high work recovery.

A further object is to provide new and highly useful fiber- and film-forming polyamides. The foregoing and other objects will more clearly appear hereinafter.

These objects are accomplished by heating to reaction temperature difunctional reactants capable of yielding linear condensation superpolymers, e. g., a diprimary, disecondary or primary-secondary diamine and a dicarboxylic acid or an amide-forming derivative thereof, at least one of said reactants containing silicon present in the reactant or reactants as a part of the divalent radical

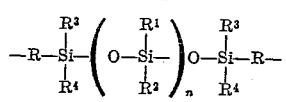

wherein $R^1$, $R^2$, $R^3$ and $R^4$ are any monovalent hydrocarbon radicals, R is any divalent hydrocarbon radical from the group consisting of divalent aromatic and cycloaliphatic hydrocarbon radicals, and $n$ is a number from 0 to 5 inclusive, the radicals R being attached to the amide-forming functional groups (e. g. carboxyl and/or amino groups) of the difunctional reactant, and continuing the reaction until a polymer having the desired intrinsic viscosity is obtained.

The general process of formation of the various silicon-containing intermediates involved for the preparation of this new series of silicon-containing polymers is illustrated in the following reactions. While this series of reactions merely shows the formation of a representative diamine, and dibasic acid, it is to be understood that the reaction may be extended by other conventional reactions to the preparation of an amino acid, or other amide forming components:

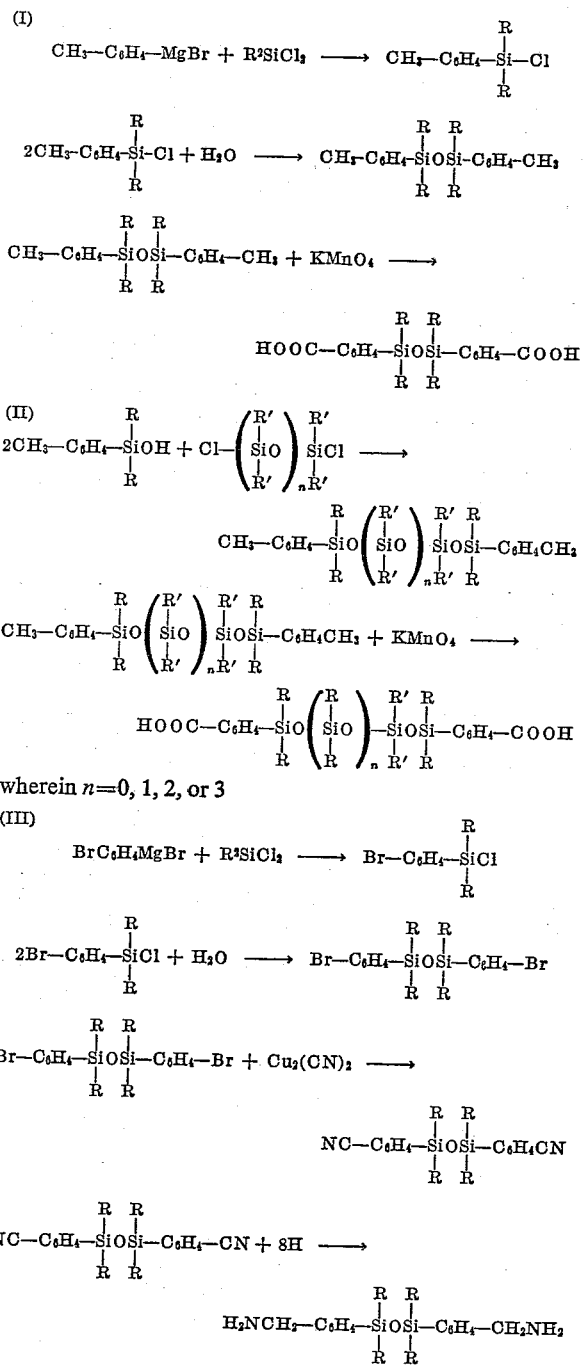

wherein $n=0, 1, 2,$ or $3$

By "difunctional reactants" is meant, of course, a reactant capable of yielding a volatile product and a non-volatile product (polymer) and comprehends both the reactants used in the preparation of superpolyamides, i. e., a diamine and dicarboxylic acid or an amide-forming derivative of a dibasic carboxylic acid.

In common with other polyamides, the polymers of this invention may be prepared by either:

1. Self-condensation of an amino-acid or amide-forming derivative or

2. Condensation of a dibasic acid or amide-forming derivative thereof with a diamine.

While for maximum silicon content of the final polymer it is preferred to use reactants both of which contain the silicon atom (a self-condensing, silicon-containing material, i. e., acid, is comprehended, of course), it is obviously possible to reduce the silicon content in half by using one difunctional reactant containing no silicon, e. g., hexamethylenediamine.

From the above it is apparent that all of the difunctional reactants described by Carothers as being useful in the preparation of polyamides may be used in connection with one or more of the silicon-containing difunctional reactants described herein to form the new polymers of this invention.

In the preferred practice of the invention, the difunctional reactants are heated at polymer-forming temperatures, generally in the range of 180–300° C., in the presence or obsence of a diluent until the product has a sufficiently high molecular weight to exhibit fiber-forming properties. As in the case of the conventional polyamides, the fiber-forming stage can be tested by touching the molten polymer with a rod and drawing the rod away. When this stage has been reached, a continuous filament of considerable strength and pliability is readily formed. With the polymers of this invention, this stage is generally the point at which the polyamide has an intrinsic viscosity of at least 0.4. Intrinsic viscosity is defined as:

$$\text{Limit } \frac{ln(\eta r)}{C} \text{ as C approaches } 0$$

wherein ($\eta r$) is the viscosity of a dilute solution of the polymer in meta-cresol divided by the viscosity of meta-cresol in the same unit at the same temperature and C is the concentration in grams of the polymer for 100 cc. of solution. In general, measurement of the intrinsic viscosity is the most convenient method for following the course of the reaction and determining whether or not a fiber-forming product has been obtained.

The reaction by which these silicon-containing polymers may be obtained, is, as indicated above, a linear condensation polymerization. It involves the formation of a by-product, such as water, alcohol, phenol, hydrogen chloride, ammonia, etc., depending upon the derivatives of the dibasic acid used in the reaction.

In general, the polyamides may be prepared most economically from a diamine and a dicarboxylic acid. The first reaction which occurs when the diamine and dicarboxylic acid are mixed and brought into sufficiently initimate contact is the formation of the diamine-dicarboxylic acid salts. The salt is generally crystalline and readily purified by recrystallization from a suitable solvent and is generally the starting material for the subsequent polymerization.

The conversion of the diamine-dibasic acid salt to a synthetic linear polymer is carried out by heating at polymer-forming temperatures, generally between 180–300° C., in the presence or absence of a diluent and under conditions which will permit the by-product of the reaction to escape until an examination of a test portion of the product indicates it has the desired fiber-forming properties. As examples of diluents which may be used in the reaction may be mentioned phenol, cresols, xylenols, diphenylolpropanes and ortho-hydroxy diphenyl. White medicinal oil is an example of a non-solvent which may be used. The first stage of the reaction can be carried out in the presence of the condensation by-product, e. g., in an autoclave under pressure. Or again, if the melt polymerization process is not desired, the polymer may be prepared by the solid polymerization process described in U. S. 2,172,374—Flory.

The polymerization reaction may be carried out at atmospheric, super-atmospheric or sub-atmospheric pressure depending upon the best conditions suitable for the polymer and method of polymerization involved. The last stages of the reaction, at least, should be carried out under conditions which permit the escape of the by-product of the reaction. Unless this is water, a vacuum will generally be desirable. Preferably also, the reaction should be carried out in the absence of oxygen, e. g., an atmosphere of nitrogen or in a vacuum. While it is generally unnecessary to add a catalyst, inorganic materials of alkaline reaction, such as oxides and carbonates, and acidic materials such as halogen salts of polyvalent elements, e. g. aluminum, tin are often helpful. Two examples of specific catalysts that may be mentioned are zinc borate and litharge.

The polymers of this invention having an intrinsic viscosity of at least 0.4 are characterized by their fiber-forming properties, i. e., their ability to be formed into filaments which can be cold drawn to fibers showing by characteristic X-ray diffraction patterns orientation along the fiber axis. One method (wet process) of spinning these polymers into filaments consists of dissolving them in a suitable solvent and extruding the solution through orifices into a liquid which dissolves the solvent but not the polymer, e. g., a hydrocarbon or in some instances water, and collecting the filaments thus formed on a suitable revolving drum. Another method (dry process) consists in extruding the solution of the polymer into a heated chamber where the solvent is removed by evaporation. Still another method (melt process) consists in extruding the molten polymer through orifices into the atmosphere where it congeals into a filament. In some cases, particularly when the filaments are large, e. g., of bristle size, it may be advantageous to spin the molten material into a cooling liquid, e. g., water. By similar processes the polymers can be formed into rods, sheets, foils, ribbons, films and the like. In the various methods of forming shaped articles from products of this invention, particularly when these articles are obtained from solution, characteristics of the filaments, etc., can be altered by blending the polymers with other polyamides and polyesters and/or resins, plasticizers, cellulose derivatives, pigments, dyes, delustrants, etc.

After spinning, the filaments are normally cold drawn since this improves their strength and elasticity. The filaments from the products of this invention vary in the extent to which they can be cold drawn, but generally the degree of cold drawing possible will lie between 150–500%. Although ribbons, sheets and the like can also be cold drawn, it is generally more advantageous to cold roll these products. By cold rolling such products in mutually perpendicular directions, it is possible to obtain products of great strength in all the directions.

Although the properties of the fibers formed from the polymers of this invention vary somewhat with the nature of the reactants used in the preparation, properties which characterize the fibers are super work recovery, good initial tensile modulus, elastic recovery, orientation along the fiber axis, as well as good strength and dyeing characteristics.

Work recovery (WR) which is a criterion of resilience, is the ratio of the amount of work done by a yarn in recovering from deformation to the work done in deforming it. To determine work recovery a stress-strain curve is used (plotting tension as the vertical axis vs. elongation as the horizontal axis) in which the yarn is extended at a constant rate of elongation of 1% per minute. The yarn specimen is held at the maximum elongation desired for 30 seconds and then allowed to retract at the same rate at which it was extended. The same specimen is extended successively several different amounts. The areas under the elongation curve and the retraction curve, respectively, represent work performed on the material and work returned. These areas may be measured with a polar planimeter and the per cent work recovery computed by means of the relation:

$$WR = \frac{\text{Area (Work Returned)}}{\text{Area (Work Performed)}} \times 100$$

Since the quantity of interest is a ratio, the absolute values of the work terms are not necessary.

Initial tensile modulus, which is also a criterion of resilience, is defined as the slope of the first reasonably straight portion of a stress-strain curve of the yarn obtained by plotting tension as the vertical axis vs. elongation as the horizontal axis as the yarn is being elongated at the rate of 10% per minute. In almost every instance this is also the steepest slope to be found on the curve. The values as used herein are in units of grams per denier (g. p. d.) per 100% elongation.

The preparations of typical silicon-containing difunctional intermediates in accordance with the general reactions hereinabove set forth are illustrated by the following examples.

EXAMPLE A

*1,3-bis (p-carboxyphenyl) tetramethyldisiloxane* a. p-TOLYLDIMETHYLCHLOROSILANE

A solution of 720 parts of p-bromotoluene in 210 parts of absolute ether was added slowly to a mixture of 107 parts of magnesium, 560 parts of dimethyldichlorosilane, and 910 parts of absolute ether under anhydrous conditions. The reaction was initiated by adding a crystal of iodine. The p-bromotoluene was added at such a rate as to maintain gentle refluxing of the mixture. After complete addition, the mixture was heated at the reflux on a steam bath overnight. The mixture was then filtered using a sintered glass filter and the filtrate distilled. Redistillation of a fraction boiling at 220–255° gave a fairly pure product boiling at 215–217° C., N. E., 179.6 (calculated, 184.5). The yield was about 50%.

b. 1,3-BIS (p-TOLYL) TETRAMETHYLDISILOXANE

This material was prepared by the hydrolysis and concurrent dehydration of p-tolyldimethylchlorosilane. The tolyldimethylchlorosilane, 250 parts was placed in a separatory funnel with 700 parts of ether and was shaken with successive portions of cold water until the water was no longer acidic. The ether layer was then dried over Drierite and the ether removed. The liquid residue was distilled and a yield of 157 parts (74%) of a clear, colorless liquid, B. P., 139–141° C. (0.2 mm.), was obtained. Since a benzene solution of this material did not react with sodium metal, the substance was assumed to be the disiloxane and not the silanol.

c. OXIDATION

A mixture of 62.8 parts of the disiloxane, 270 parts of pyridine, and 130 parts of water was heated on a steam bath and 145 parts of potassium permanganate added portion-wise and with rapid stirring. The reaction resulting caused the mixture to reflux during the addition of the KMnO₄. After complete addition, the mixture was heated for 1–2 hours, then treated with methanol to destroy excess KMnO₄, filtered and the filtrate acidified with concentrated HCl. The precipitate was collected on a filter, washed with water, and then dissolved in sodium bicarbonate solution, treated with Darco and reprecipitated with HCl. A yield of 54 parts (72%) of the acid, M. P., 220–230° C., N. E., 219, was obtained.

In order to purify this crude acid, it was converted to the methyl ester which was purified and then hydrolyzed back of the acid. The ester was prepared by refluxing a mixture of 146 parts of the acid, 720 parts of methanol and 27.5 parts of concentrated sulfuric acid for 4–5 hours. The solution was then cooled, mixed with ether, and the solution washed several times with water, then with sodium bicarbonate solution. The ether layer was dried over Drierite and the ether distilled off. The residual oil was crystallized from hexane yielding 80 parts of material, M. P., 58–62° C. Recrystallization from hexane gave 60 parts of ester, M. P., 57–61°.

The above ester was hydrolyzed by refluxing with 315 parts of ethyl alcohol and 17 parts of potassium hydroxide in 20 parts of water for 1–2 hours. The resulting solution was poured into cold water, washed with ether, treated with Darco and acidified with concentrated HCl. The acid after drying melted at 225–234° C. and had a neutral equivalent of 191 (calcd., 187).

EXAMPLE B

*1,7-bis(p-carboxyphenyl)-1,1,7,7-tetraphenyl-3,3,5,5-tetramethyltetrasiloxane*

This compound was prepared by condensing p-tolyldiphenylsilanol with 1,3-dichlorotetramethyldisiloxane in the presence of pyridine. The disiloxane was prepared by partial hydrolysis of dimethyldichlorosilane as described in U. S. Patent No. 2,381,366 to W. I. Patnode. The p-tolyldiphenylsilanol was prepared by the hydrolysis of the chlorosilane.

a. p-TOLYLDIPHENYLSILANOL

A solution of 360 parts of p-bromotoluene in 250 parts of absolute ether was added slowly to a mixture of 506 parts of diphenyldichlorosilane and 55 parts of magnesium in 700 parts of absolute ether. The reaction was initiated by adding a crystal of iodine. After complete addition of the bromotoluene the mixture was heated at the reflux for 1½ hours after which it was filtered in a dry box, the residue being washed thoroughly with dry benzene. The filtrate was then distilled and the fraction boiling at 175°–205° C. (0.3 mm.) being collected as crude p-tolyldiphenylchlorosilane. This fraction was redistilled and that portion boiling at 175–185° C. (0.3 mm.) was collected. A yield of about 400 parts was obtained. This material was further purified by recrystallization from hexane.

The tolydiphenylchlorosilane was hydrolyzed by dissolving in ether and shaking in a separatory funnel with successive portions of cold water until the water was no longer acid to litmus. The ether layer was then dried and the ether removed at reduced pressure. The residue crystallized to a solid, melting point 78–85° C. and the silanol was purified by recrystallization from hexane.

The above compound was identified as a silanol by the fact that the benzene solution reacted with sodium and also because the material could be dehydrated to 1,3-di-p-tolyltetraphenyldisiloxane.

b. CONDENSATION OF p-TOLYLDIPHENYLSILANOL WITH 1,3-DICHLOROTETRAMETHYLDISILOXANE

A solution of 51 parts of the dichlorodisiloxane was added slowly and with constant stirring to a solution of 145 parts of the silanol and 60 parts of pyridine in 350 parts of dry benzene, maintaining the temperature at room temperature, by occasional cooling. After complete addition, the mixture was heated at reflux for about 2 hours. It was then poured into water, ether added and the organic layer washed several times with water, after which it was dried over calcium chloride. The ether and benzene were then removed by warming on a steam bath at reduced pressure. The residue was a viscous, colorless liquid amounting to 169 parts. It finally crystallized to a rather waxy solid melting at 47–52° C. The material was oxidized directly to the acid without further purification.

c. OXIDATION OF THE 1,7-DI-p-TOLYLTETRASILOXANE

A solution of 169 parts of the tetrasiloxane in 510 parts of pyridine and 130 parts of water, was warmed on a steam bath and 320 parts of potassium permanganate added portion-wise over a period of 1–2 hours while stirring vigorously. The resulting reaction caused the mixture to reflux during this period. After complete addition of the permanganate, 130 parts more of water was added and the mixture heated an additional 2 hours with stirring. Methanol was then added to destroy the excess permanganate, and the mixture filtered, the residue being washed thoroughly with hot water.

The colorless filtrate was made acid with concentrated HCl and the mixture extracted with ether. The ether solution was washed with acidified water, dried and evaporated to dryness. The thick, colorless liquid was stirred with 500 parts of hexane causing a white solid to crystallize. A yield of 115 parts was obtained. After two recrystallizations from benzene-hexane (1 to 2.5) the material melted at 117–122° C., N. E., 415 (calculated, 383). Repeated recrystallizations of this material gave no further apparent purification. It was then found that, after heating in a vacuum oven at 100° C. overnight, the material had a neutral equivalent of 389 and a melting point of 150–152° C. The acid had originally crystallized as a partial hydrate.

EXAMPLE C

Bis(p-aminomethylphenyl)dimethylsilane

*a.* BIS (p-BROMOPHENYL) DIMETHYLSILANE

A solution of 43 parts (1.3 mole) of dimethyldichlorosilane in 70 parts of dry ether was added slowly to the Grignard solution from 185 parts (2.3 mole) of p-dibromobenzene and 20 parts of magnesium in 315 parts of dry ether. The addition caused a mild reaction. The mixture was refluxed for 2 hours and then some of the ether allowed to distill off. There was only a small amount of precipitate at the end of this reaction. The residue was decomposed with water and the ether layer washed, dried and distilled. Appreciable quantities of bromobenzene and p-dibromobenzene were obtained in the forerun. A yield of 38 parts (31%) of a colorless oil, B. P. 155–170° C. (.2 mm.) was obtained. After several recrystallizations from ethanol the compound was obtained as colorless needles, M. P. 72–73° C. Anal. calcd. for $C_{14}H_{14}Br_2Si$: Br, 43.2. Found: Br, 41.3.

*b.* CONVERSION OF BIS (p-BROMOPHENYL) DIMETHYLSILANE TO THE DINITRILE

A mixture of 14.8 parts (.04 mole) of bis(p-bromophenyl)dimethylsilane, 8.5 parts of cuprous cyanide and 10 parts of dry pyridine was sealed at atmospheric pressure in a tube and the tube heated at 250° C. for 3½ hours. During this period the contents were shaken several times. The dark colored liquid reaction mixture was cooled and then poured into ether. After stirring thoroughly for a few minutes the mixture was filtered and the dark colored solid residue washed thoroughly with ether. The solid residue, 21 parts when dried, was thought to be a pyridine-cuprous cyanide complex.

The ether solution was washed several times with concentrated ammonium hydroxide then with dilute HCl and finally dried and evaporated to dryness. The residual oil, 715 parts, was dissolved in 20 parts of ethyl alcohol, treated with Darco and allowed to crystallize. There was obtained 5 parts of light yellow crystals, M. P. 73–74° C. Several recrystallizations from 3:1 hexane-benzene mixture gave colorless plates M. P. 100–101° C.

*Anal.*—Calcd. for $C_{16}H_{14}N_2Si$: N, 10.70; Si, 10.71. Found: N, 10.84; Si. 10.87.

*c.* BIS (p-AMINOMETHYLPHENYL) DIMETHYLSILANE

A charge of 85 parts of bis (p-cyanophenyl) dimethylsilane, 70 parts of liquid ammonia and 10–15 g. of Raney nickel were shaken in a bomb at 125–130° and 5000 lb./sq. in. hydrogen pressure for 3 hours. After cooling, the catalyst was removed by filtration and the mixture distilled. A viscous oil, B. P. 180–190° C. (.5 mm.) N. E. 140.36 was obtained. Upon cooling this material was caused to crystallize. It was then recrystallized from a mixture of ½ its weight of absolute ether, by cooling to −40° C. A yield of 26 g. of white crystals, M. P. 45–47° was obtained. This material had a nitrogen content of 10.68% and a neutral equivalent of 135.5, theoretical being N=10.36% and N. E.=135.

The following examples are specifically illustrative of the preparation and application of the products of this invention from typical silicon-containing intermediates. Parts and percentages are by weight unless otherwise indicated.

EXAMPLE I

The hexamethylenediamine salt of 1,3-bis (p-carboxyphenyl)tetramethyldisiloxane is prepared by adding an alcohol solution of hexamethylenediamine to a nearly equivalent quantity of the acid dissolved in alcohol. The precipitated salt is washed with alcohol and ether, then dried. This salt melts at 225–230°. It is polymerized by heating for one hour at 225° in a sealed evacuated tube followed by a one-hour heating cycle at 250° in an atmosphere of nitrogen. Polymerization is concluded by heating in high vacuum at 259° for 4 hours. The polymer is clear, colorless and can be manually spun into fibers or melt pressed into films. The intrinsic viscosity is .48 and the softening temperature is 140–145°.

EXAMPLE II

The salt of bis(aminomethylphenyl) dimethylsilane and bis(p-carboxyphenyl) tetramethyldisiloxane, M. P. 140°, is prepared by reacting the amine and acid as described above. The polymer is prepared by means of the following heating cycle: ½ hour at 218° in an atmosphere of nitrogen, ½ hour at 273°, and 2½ hours at 273° and high vacuum.

The clear, colorless polymer has an intrinsic viscosity of .57 and softening temperature of 165°. This polymer can be press spun at 205° and 10,000#/sq. in. pressure into mono-filaments which have the following properties:

| | |
|---|---|
| Tenacity _____ g. p. d__ | 1.1 |
| Elongation _____ percent__ | 7.6 |
| Initial tensile modulus _____ | 30 |

| Work recovery: | Percent |
|---|---|
| 1% elongation _____ | 99 |
| 2% elongation _____ | 97 |
| 3% elongation _____ | 92 |

EXAMPLE III

The hexamethylene diamine salt of 1,7-bis(p-carboxyphenyl)1,1,7,7 - tetraphenyl - 3,3,5,5 - tetramethyltetrasiloxane, melting point 205–210°, is prepared in the manner previously described in 85% yield. The polymer is prepared by heating for ¼ hour at 218° in an atmosphere of nitrogen followed by a one-hour cycle at 259° and concluded with one-hour cycle in high vacuum at 259°. The clear, colorless polymer has an intrinsic viscosity of .32 and sticking temperature of 135–140°.

EXAMPLE IV

The bis(p-aminomethylphenyl) dimethylsilane salt of 1,7 - bis(p-carboxyphenyl)1,1,7,7 - tetraphenyl - 3,3,5,5-tetramethyltetrasiloxane, melting point 210–215°, is prepared in 90% yield. It is polymerized by the following heating cycle: ¼ hour at 259° in an atmosphere of nitrogen; one hour at 259° in high vacuum and ½ hour at 273° in high vacuum. The polymer has an intrinsic viscosity of .3, softening temperature 150–155, and is clear and colorless.

As many widely different embodiments can be made without departing from the spirit and scope of this invention, it is to be understood that said invention is in no way restricted save as set forth in the appended claims.

I claim:

1. A process for producing synthetic linear polyamides which comprises heating together as polyamide-forming reactants a diamine and a compound from the group consisting of dicarboxylic acid and amide-forming derivatives thereof, at least one of said reactants containing silicon present in the divalent radical

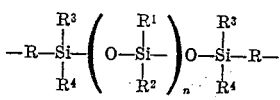

wherein R', R², R³ and R⁴ are any monovalent hydrocarbon radicals, R is a divalent hydrocarbon radical selected from the group consisting of divalent aromatic and cycloaliphatic hydrocarbon radicals, and $n$ is a number from 0 to 5 inclusive, the radicals R being attached to amide-forming functional groups of said polyamide-forming reactants, and continuing the heating under conditions effective to remove volatile by-products of the reaction until a polymer of the desired intrinsic viscosity is obtained.

2. A process for producing synthetic linear polyamides which comprises heating together as polyamide-forming reactants a diamine, and a dicarboxylic acid, at least one of said reactants containing silicon present in the divalent radical

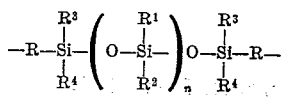

wherein R', R², R³ and R⁴ are any monovalent hydrocarbon radicals, R is a divalent hydrocarbon radical selected from the group consisting of divalent aromatic and cycloaliphatic hydrocarbon radicals, and $n$ is a number from 0 to 5 inclusive, the radicals R being attached to amide-forming functional groups of said polyamide-forming reactants, and continuing the heating under conditions effective to remove volatile by-products of the reaction until a polymer of the desired intrinsic viscosity is obtained.

3. A process for producing synthetic linear polyamides which comprises heating together as polyamide-forming reactants a diamine, and a dicarboxylic acid, at least one of said reactants containing silicon present in the divalent radical

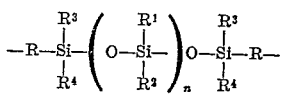

wherein R', R², R³ and R⁴ are any monovalent hydrocarbon radicals, R is a divalent hydrocarbon radical selected from the group consisting of divalent aromatic and cycloaliphatic hydrocarbon radicals, and $n$ is a number from 0 to 5 inclusive, the radicals R being attached to amide-forming functional groups of said polyamide-forming reactants, and continuing the heating under conditions effective to remove volatile by-products of the reaction until a polymer having an intrinsic viscosity of at least 0.4 is obtained.

4. A synthetic linear polyamide containing the recurring structural unit:

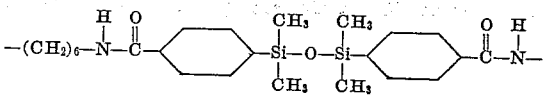

5. A synthetic linear polyamide containing the recurring structural unit:

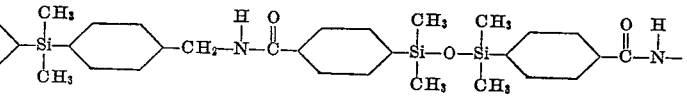

6. A synthetic linear polyamide containing the recurring structural unit:

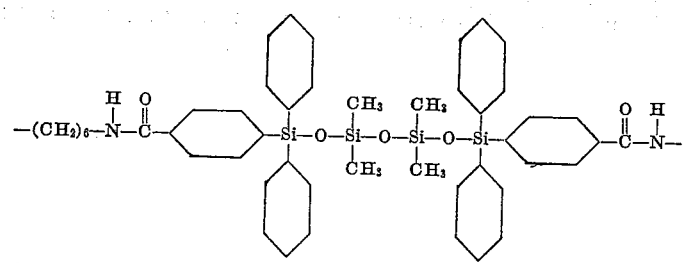

7. A synthetic linear polyamide containing the recurring structural unit:

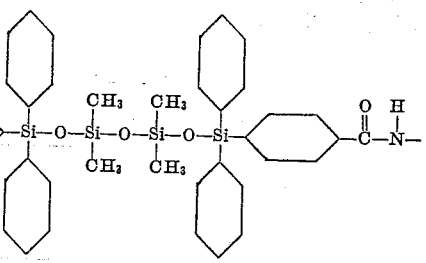

8. A synthetic linear polyamide containing the recurring structural unit:

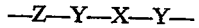

—Z—Y—X—Y— wherein X has the structure:

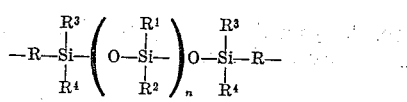

wherein R', R², R³ and R⁴ are any monovalent hydrocarbon radical, R is a divalent hydrocarbon radical from the group consisting of divalent aromatic and cycloaliphatic hydrocarbon radicals and $n$ is a number from 0 to 5; Y has the structure:

and Z is a member of the group consisting of alkylene, X and

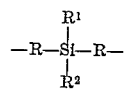

9. A synthetic linear polyamide containing the recurring structural unit:

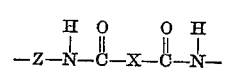

wherein X has the structure:

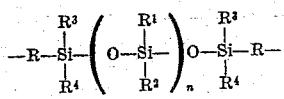

wherein $R^1$, $R^2$, $R^3$ and $R^4$ are any monovalent hydrocarbon radical, R is a divalent hydrocarbon radical from the group consisting of divalent aromatic and cycloaliphatic hydrocarbon radicals and $n$ is a number from 0 to 5, and Z is a member of the group consisting of alkylene, X and

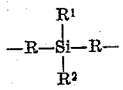

10. A synthetic linear polyamide containing the recurring structural unit:

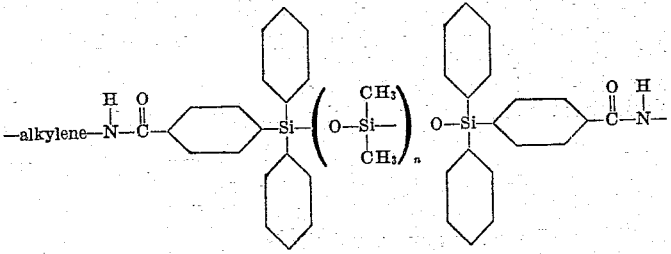

wherein Y has the structure:

$$-\overset{O}{\underset{}{C}}-\overset{H}{\underset{}{N}}-$$

and $n$ is a number from 0 to 5.

11. A synthettic linear polyamide containing the recurring structural unit:

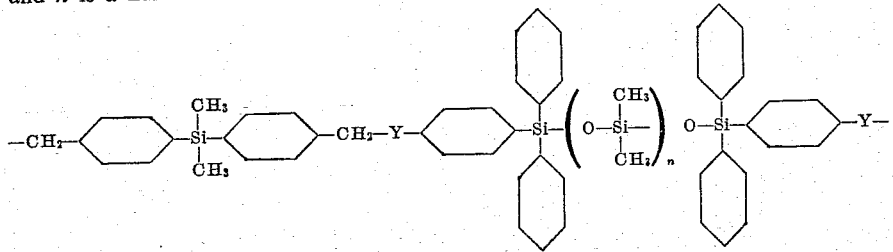

wherein $n$ is a number from 0 to 5.

12. A synthetic linear polyamide containing the recurring structural unit:

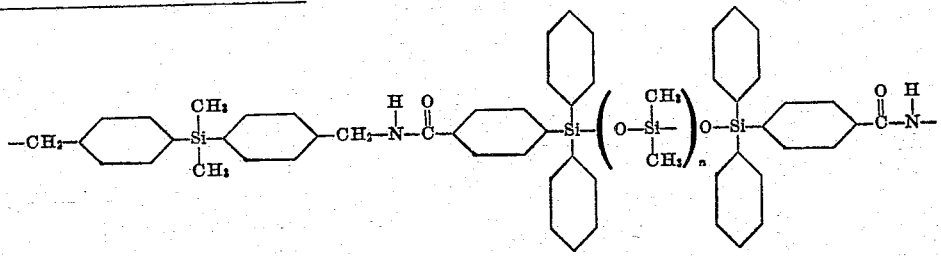

wherein Y has the structure:

and $n$ is a number from 0 to 5.

13. A synthetic linear polyamide containing the recurring structural unit:

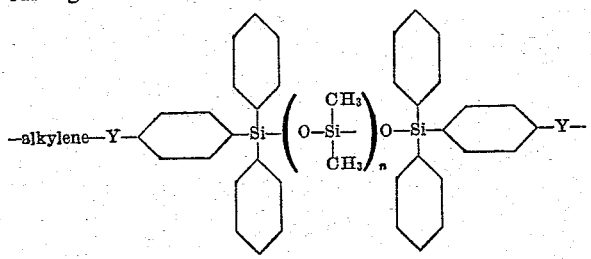

wherein $n$ is a number from 0 to 5.

References Cited in the file of this patent

UNITED STATES PATENTS

| | | |
|---|---|---|
| 2,130,948 | Carothers | Sept. 20, 1938 |
| 2,386,452 | Fleming | Oct. 9, 1945 |
| 2,527,590 | Speier | Oct. 31, 1950 |
| 2,601,237 | Barry et al. | June 24, 1952 |
| 2,618,646 | Hatcher et al. | Nov. 18, 1952 |
| 2,628,244 | Speier | Feb. 10, 1953 |